(12) United States Patent
Reiter et al.

(10) Patent No.: US 9,914,846 B2
(45) Date of Patent: Mar. 13, 2018

(54) USE OF MODIFIED EFFECT PIGMENTS IN RADIATION-CURABLE COATING COMPOSITIONS

(71) Applicant: SCHLENK METALLIC PIGMENTS GMBH, Roth-Barnsdorf (DE)

(72) Inventors: Andreas Reiter, Roth (DE); Nina Lang, Erlangen (DE); Christa Mueller, Ellingen (DE); Michael Bartelt, Roth (DE)

(73) Assignee: SCHLENK METALLIC PIGMENTS GMBH, Roth-Barnsdorf (DE)

( * ) Notice: Subject to any disclaimer, the term of this patent is extended or adjusted under 35 U.S.C. 154(b) by 0 days.

(21) Appl. No.: 14/893,637

(22) PCT Filed: May 22, 2014

(86) PCT No.: PCT/EP2014/060557
§ 371 (c)(1),
(2) Date: Nov. 24, 2015

(87) PCT Pub. No.: WO2014/187907
PCT Pub. Date: Nov. 27, 2014

(65) Prior Publication Data
US 2016/0130461 A1 May 12, 2016

(30) Foreign Application Priority Data
May 24, 2013 (DE) .................. 10 2013 008 926

(51) Int. Cl.
| C09D 5/26 | (2006.01) |
| C09D 5/36 | (2006.01) |
| C09D 133/08 | (2006.01) |
| C09C 1/00 | (2006.01) |
| C09D 7/12 | (2006.01) |
| C08K 3/08 | (2006.01) |
| C08K 9/06 | (2006.01) |

(52) U.S. Cl.
CPC .......... *C09D 133/08* (2013.01); *C09C 1/0021* (2013.01); *C09D 5/36* (2013.01); *C09D 7/1225* (2013.01); *C09D 7/1291* (2013.01); *C01P 2006/60* (2013.01); *C08K 3/08* (2013.01); *C08K 9/06* (2013.01); *C08K 2003/0812* (2013.01); *C09C 2200/1054* (2013.01)

(58) Field of Classification Search
CPC ............... C09D 1/0021; C09D 113/08; C09D 113/536; C09D 7/1225; C09D 7/1291; C08K 9/06; C08K 2003/0812; C08K 220/1054
USPC .................................... 522/71, 81
See application file for complete search history.

(56) References Cited

U.S. PATENT DOCUMENTS

| 6,761,762 | B1 * | 7/2004 | Greiwe | C09D 5/36 106/403 |
| 7,109,262 | B2 * | 9/2006 | Sapper | C09D 5/36 522/100 |
| 2004/0226480 | A1 | 11/2004 | Greiwe et al. | |
| 2008/0249209 | A1 | 10/2008 | Trummer et al. | |
| 2009/0264575 | A1 | 10/2009 | Henglein et al. | |
| 2010/0036036 | A1 | 2/2010 | Oyanagi | |
| 2011/0118384 | A1 | 5/2011 | Bugnon et al. | |
| 2012/0287213 | A1 | 11/2012 | Engel et al. | |
| 2014/0050768 | A1 | 2/2014 | Struck et al. | |

FOREIGN PATENT DOCUMENTS

| DE | 19820112 A1 | 11/1999 |
| DE | 10361437 A1 | 7/2005 |
| DE | 102004041586 A1 | 3/2006 |
| DE | 102005037611 A1 | 2/2007 |
| DE | 102011103882 A1 | 9/2012 |
| EP | 0634459 A2 | 1/1995 |
| EP | 1084198 B1 | 6/2008 |
| JP | 2012-077221 A | 4/2012 |
| WO | WO 99/57204 A1 | 11/1999 |
| WO | WO 2005/063897 A2 | 7/2005 |
| WO | WO 2008/095697 A1 | 8/2008 |
| WO | WO 2010/063430 A1 | 6/2010 |

OTHER PUBLICATIONS

International Search Report dated Sep. 22, 2014 issued in PCT/EP2014/060557.
English Abstract of WO 2006/021386 A1, dated Mar. 2, 2006.
Schwalm, Reinhold, "UV Coatings, Basics, Recent Developments and New Applications", retrieved from the internet, Jul. 13, 2015, URL:http://www.elsevier.com/books/uv-coatings/schwalm/978-0-444-52979-4.

* cited by examiner

*Primary Examiner* — Sanza Mcclendon
(74) *Attorney, Agent, or Firm* — Scully, Scott, Murphy & Presser

(57) ABSTRACT

The present invention relates to the use of a modified effect pigment in a radiation-curable coating composition, wherein the modified effect pigment is an effect pigment that is coated with at least one metal oxide layer to which at least one organic compound having one or more functional groups with a carbon-carbon multiple bond is bound. The invention is particularly suitable for metallic effect pigments, in particular aluminum pigments. A further part of the invention is the use of a modified effect pigment in a radiation-curable coating composition, wherein the modified effect pigment is an effect pigment to which at least one organic compound having one or more functional groups with a carbon-carbon multiple bond is bound. The radiation-curable, preferably UV-curable, coating compositions can in particular be lacquers, paints, printing inks, nail varnish or plastics.

17 Claims, No Drawings

USE OF MODIFIED EFFECT PIGMENTS IN RADIATION-CURABLE COATING COMPOSITIONS

The present application is a '371 of PCT Application No. PCT/EP2014/060557, which was filed on May 22, 2014.

The invention relates to the use of effect pigments modified with organic compounds in radiation-curable coating compositions.

Pigments, including in particular metallic pigments, are frequently used to impart colour in lacquers, paints, printing inks, powder coatings, cosmetics or plastics. Paints, lacquers, printing inks, cosmetics and powder coatings are liquid or powdered coating materials which are applied onto surfaces in order to obtain both improved optical and improved physical properties, such as corrosion protection. After the coating compositions have been applied, they are cured by physical and/or chemical methods to form a continuous solid film on said surface. These physical and chemical curing methods include, for example, evaporation of solvent or curing by means of electromagnetic radiation, such as UV radiation.

The use of UV technology provides a number of advantages over other methods in terms of efficiency with regard to energy, space and processing time; in addition, use of solvents can be avoided and UV technology enables processing to be carried out at ambient temperature. This is associated with improved environmental compatibility as well as a high quality of the coated product. UV technology in the broader sense also includes UV/water hybrid systems and Electron Beam (EB) technologies.

Paints and lacquers generally comprise binders, solvents, pigments and optionally fillers. Metallic effect pigments are often employed as pigments in order to obtain products with high aesthetic value. Metallic effect pigments are characterized by high metallic gloss and very good hiding power. The optical effect of metallic effect pigments results from the reflection of light on the parallel oriented metal platelets.

However, the use of effect pigments, in particular of metallic effect pigments, in lacquers, paints, printing inks, powder coatings, cosmetics or plastics often presents a problem, especially when used in UV-curing systems. One difficulty with the use of metallic effect pigments in UV-curable coating compositions lies in the fact that curing takes place within fractions of a second in UV-curable coating compositions and the resulting film shrinkage prevents parallel orientation of the metal pigments. This has a marked detrimental effect on the optical properties of the effect pigments. Furthermore, the abrasion resistance of coatings with conventional, untreated metallic effect pigments in UV-curable systems was not ideal. At present, the properties of coating systems are generally optimized by applying reagents onto metallic pigments, which cause floating ("leafing") of the pigments in the printing ink or lacquer. This so-called leafing behaviour results in orientation of the particles at the surface of the lacquer film, which improves the gloss and brilliance of the print film. On the down side, however, this has a negative effect on adhesion and abrasion resistance as well as on interlayer adhesion in multilayer constructions.

EP 1 084 198 B1 describes effect pigments for aqueous coating systems, which are coated with reactive orientation aids. The pigments described therein display non-leafing behaviour and are said to be easily wetted by the binding agent of an aqueous paint or aqueous lacquer on the one hand and to form an intimate bond with the surrounding binding agent matrix on the other hand. This is said to improve the resistance against condensation water and against corrosive influences of a cured lacquer based on an aqueous coating system.

As already described above, the orientation of metallic pigments according to the current state of the art presents a problem, especially in UV-curing printing inks or lacquers, since the complete curing within fractions of a second and the resulting film shrinkage mean that a parallel and homogeneous orientation of the metallic effect pigments is not possible, particularly in the case of vacuum-metallized pigments, in so far as the pigments are untreated. A person skilled in the art understands vacuum-metallized pigments to mean metallic effect pigments that are produced by stripping and grinding PET films that have been metallized in a high vacuum.

The object is now to provide a pigment/coating system having both good application properties and good optical properties in the UV curing of printing inks and lacquers. Within the framework of the present invention, application properties are understood in particular as very good abrasion resistance together with good crosslinkability and wettability of the pigment in the UV-curable system. Good optical properties are to be understood as very high gloss and good hiding power.

Surprisingly, it has now been found that, in a radiation-curable coating composition, the use of specific modified effect pigments as described in claim 1 or 2 results in excellent coating as well as optical properties. In particular, coatings having excellent abrasion resistance combined with very good metallic effects are obtained within the framework of the present invention. Another advantage is the improved storage stability of the corresponding lacquers and paints.

The present invention therefore relates to the use of a modified effect pigment in a radiation-curable coating composition, wherein the modified effect pigment is an effect pigment that is coated with at least one layer of a metal oxide, comprising silicon dioxide, aluminum oxide, titanium dioxide, iron oxide, tin oxide, zinc oxide or mixtures thereof, characterized in that at least one organic compound having one or more functional groups with a carbon-carbon multiple bond is bound to said layer. Through the carbon-carbon multiple bond(s) of the organic compound, the effect pigment can crosslink with the reactive monomers or binders in the radiation-curable, or preferably in the UV-curable, coating system. The present invention is directed to radiation-curable systems and does not encompass any systems that cure under the action of heat, such as for example powder coatings.

The invention further relates to the use of a modified effect pigment in a radiation-curable coating composition, wherein the modified effect pigment is an effect pigment to which at least one organic compound having one or more functional groups with a carbon-carbon multiple bond is bound, wherein the functional group is preferably an acrylate group, a methacrylate group, a strained ring system or a vinyl group and/or wherein the carbon-carbon multiple bond is preferably terminal. Through the carbon-carbon multiple bond(s) of the organic compound, the effect pigment can crosslink with the reactive monomers or binders in the radiation-curable, or preferably in the UV-curable, coating system.

According to one embodiment, these modified effect pigments according to the invention are covered with at least one layer of one or more metal oxides and at least one organic compound having one or more functional groups with a carbon-carbon multiple bond is bound to said metal oxide layer. According to another embodiment, a further part of the invention is the use of modified effect pigments having no metal oxide layer on the surface of the effect pigment but in which the organic modifying compound, which is preferably terminal or carries functional groups as defined above, is bound directly to the surface of the effect pigment. Through the carbon-carbon multiple bonds of the organic compounds, the effect pigments can crosslink with the reactive monomers in the radiation-curable, or preferably in the UV-curable, coating system during radiation curing or preferably UV curing.

Within the framework of the present invention, radiation-curable coating compositions are understood to be compositions that cure upon exposure to UV light, or UV radiation, IR or electron beams. They are preferably UV-curable coating compositions.

For the effect pigments used according to the invention, conventional metallic effect pigments can be used. These are preferably metallic effect pigments selected from the group consisting of aluminum, titanium, zirconium, copper, zinc, gold, silver, tin, steel, iron. Furthermore, alloys of said metals, such as gold bronze or silver bronze, can also be used. Within the framework of the invention, special effect pigments, such as pearlescent pigments, mica or mixtures thereof, can also be used. Aluminum pigments are preferred, in particular cornflake or silver dollar pigments. Particularly preferably, vacuum-metallized pigments (VMP) can also be used, such as DECOMET® particles, obtainable from Schlenk Metallic Pigments GmbH, Roth, Germany.

The modified effect pigment preferably has a metal oxide layer. The oxides used in the metal oxide layer comprise silicon dioxide, aluminium oxide, titanium dioxide, iron oxide, tin oxide and zinc oxide or mixtures thereof. However, two or more layers of different metal oxides, such as e.g. silicon dioxide and iron oxide, can also be present. The application of the metal oxide layer takes place according to methods known to a person skilled in the art. Preferably, the metal oxide layer is made by means of a sol-gel process in which tetraethyl orthosilicate, a short-chain alcohol, water and a base are employed.

The organic compounds employed for modifying the effect pigments contain at least one functional group with a carbon-carbon multiple bond. The carbon-carbon multiple bond is in particular a C=C. These carbon double bonds are, if possible, terminal double bonds in order to achieve increased reactivity with the binder or monomer of the radiation- or UV-curable system and thus better crosslinking. The functional groups with carbon-carbon multiple bonds are preferably an acrylate group, a methacrylate group or a vinyl group. Also preferred are strained ring systems, such as a cyclopropane ring, a cyclobutane ring, a cyclohexane ring, an epoxide (oxirane), strained ring systems and an oxirane, e.g. epoxycyclobutyl, epoxycyclopentyl, epoxycyclohexyl, epoxycyclooctyl, or an aziridine and derivatives thereof, which are also to be subsumed under the term carbon-carbon multiple bond within the framework of the present invention.

Preferred examples of the organic compounds according to the invention that are bound to the metal oxide layer or to the surface of the effect pigment are silanes and acid anhydrides as well as organophosphorus compounds and titanates and borates with at least one carbon-carbon multiple bond functionality. They are preferably low molecular weight compounds having a molecular weight in the range of 120 g/mol to 440 g/mol, in particular 150 g/mol to 400 g/mol, particularly preferably 200 g/mol to 250 g/mol. Particularly preferably, acrylic silanes, methacrylic silanes or maleic anhydride or phosphonic acids such as a vinyl phosphonic acid or a vinyl phosphonate are employed. Examples of silanes according to the invention that can be used are: methacryloxypropenyl trimethoxysilane, 3-methacryloxypropyl trimethoxysilane, 3-acryloxypropyl trimethoxysilane, 2-acryloxyethyl trimethoxysilane, 3-methacryloxypropyl triethoxysilane, 3-acryloxypropyl trimethoxysilane, 2-methacryloxyethyl triethoxysilane, 2-acryloxyethyl triethoxysilane, 3-methacryloxypropyl tris(methoxyethoxy)silane, 3-methacryloxypropyl tris(butoxyethoxy)silane, 3-methacryloxypropyl tris(propoxy)silane, 3-methacryloxypropyl tris(butoxy)silane, 3-acryloxypropyl tris(methoxyethoxy)silane, 3-acryloxypropyl tris(butoxyethoxy)silane, 3-acryloxypropyl tris(butoxy)silane, vinyl trimethoxysilane, vinyl triethoxysilane, vinyl ethyl dichlorosilane, vinyl methyl diacetoxysilane, vinyl methyl dichlorosilane, vinyl methyl diethoxysilane, vinyl triacetoxysilane, vinyl trichlorosilane, phenyl vinyl diethoxysilane, phenyl allyl dichlorosilane etc. Particularly preferred examples of a silane are the methacrylate functional products Dow Corning Z 6030 or Dynasylan® MEMO.

The organic compound is a monomeric compound and not an oligomeric or polymeric compound. Preferred examples of such monomeric organic compounds with carbon-carbon multiple bond functionality are mentioned above.

Further preferred are organic compounds, such as silanes, acid anhydrides or organophosphorus compounds with a carbon-carbon double bond, which carry no additional functional group, such as for example a hydroxyl, amino or carboxylic acid group, besides the carbon-carbon double bond. However, besides the organic compound to be used according to the invention for crosslinking with the pigment and the binder, a second organic compound can also be employed on the pigment, said compound having a functional group other than a carbon-carbon multiple bond, wherein this other functional group is a reactive group that reacts with the binder. The second, optionally present, organic compound is preferably also a monomer.

The organic compounds, in particular the silanes, acid anhydrides or organophosphorus compounds, can form bonds with the metal oxide layer of the effect pigment. These organic compounds are preferably bound covalently to the metal oxide layer on the effect pigment (or, in the absence of the metal oxide layer, to the surface of the effect pigment) via the silane group, the phosphonate group or one of the acid groups. The carbon-carbon multiple bond is accordingly on the side facing away from the pigment and can react with the binders or the corresponding monomers of the radiation-curable, preferably UV-curable, coating system. A modified effect pigment within the meaning of the invention is therefore on the one hand an effect pigment which is coated with at least one layer of a metal oxide, comprising silicon dioxide, aluminum oxide, titanium dioxide, iron oxide, tin oxide, zinc oxide or mixtures thereof, characterized in that at least one organic compound having one or more functional groups with a carbon-carbon multiple bond is bound to said layer. On the other hand it can be an effect pigment wherein at least one organic compound having one or more functional groups with a carbon-carbon multiple bond is bound to the effect pigment.

The modified effect pigment to be used according to the invention preferably has no organic oligomers or polymers. In particular, the modified effect pigment in this case has no coating of oligomeric or polymeric binders (such as for example polyacrylates or polymethacrylates or other synthetic resin coatings), either as a separate, optionally crosslinkable coating or as crosslinking with the organic compound according to the invention. Before the use according to the invention in a radiation-curable composition, (monomeric) organic compounds having one or more functional groups with a carbon-carbon multiple bond, but not organic polymers or oligomers, are bound to the modified effect pigment.

Also preferred is the use according to the invention of a modified effect pigment, wherein said modified effect pigment consists of an effect pigment that is optionally coated with at least one layer of a metal oxide, comprising silicon dioxide, aluminum oxide, titanium dioxide, iron oxide, tin oxide, zinc oxide or mixtures thereof, and at least one organic compound, wherein the organic compound has one or more functional groups with a carbon-carbon multiple bond, and wherein the organic compound is bound to the effect pigment or to the optionally present layer of a metal oxide. As described above, the organic compound is present as a monomer.

The organic compounds can be present in the modified pigment in a quantity of 0.01 to 10 wt. %, based on the total weight of effect pigment with metal oxide layer and organic modification. For the embodiment without a metal oxide layer, the organic compounds can be present in the modified pigment in a quantity of 0.01 to 10 wt. %, based on the total weight of effect pigment and organic modification. This corresponds in each case to the total weight of the total solids of the coated, modified pigments. The proportion is preferably in the range of 0.05 to 5 wt. %, particularly preferably 0.5 to 3 wt. % and still more preferably 1.2 to 2.5 wt. %.

In a preferred embodiment, based on the total weight of the total solids, the proportion of organic compound, preferably of methacrylate functional silane, is 0.05 to 5 wt. %, preferably 0.5 to 3 wt. %, the proportion of effect pigment, preferably aluminum, is preferably 25 to 92.5 wt. %, preferably 50 to 90 wt. % and quite particularly preferably 70 to 85 wt. %, the proportion of metal oxide layer, preferably silicon dioxide, is 8 to 80 wt. %, preferably 10 to 50 wt. % and 12-25 wt. %.

For the production of the modified effect pigments, the metal oxide coated effect pigment can be put in first in a solvent, for example isopropanol, and heated, for example to 35 to 60° C. After addition of a base, such as for example ammonia or an amine, and optionally water, the organic compound used for functionalization is added. The base can also be added simultaneously with the addition of the organic compound. The mixture is then stirred for a specific period, for example for 1 to 20 hours. After cooling, the mixture can be adjusted to the desired solids content with a suitable solvent, for example isopropanol. The mixture can also be concentrated once the reaction has finished and the pigment filter cake that is obtained can either be redispersed in a suitable solvent or the solvent can be removed. Preferably, redispersion takes place, for example in isopropanol. The solids content of the modified pigment mixture can be in the range of 1 to 50 wt. % and preferably 5 to 15 wt. %. The production of the effect pigment with organic modification but without a metal oxide layer takes place in a similar manner by using the corresponding effect pigment without a metal oxide layer.

Within the framework of the use according to the invention, the modified effect pigments are preferably employed as a dispersion in the radiation-curable composition. The modified effect pigment is preferably not employed as a powder.

Of course, the features mentioned above and those yet to be explained below can be employed not only in the combinations stated but also in other combinations or individually without departing from the framework of the present invention. This is true in particular for the specifically mentioned organic compounds, effect pigments, metal oxide layers, binders, monomers and the respective quantities thereof, of which the various combinations should be considered to be disclosed according to the invention.

The incorporation and mixing of the modified pigments according to the invention into the UV coating systems takes place by conventional means familiar to a person skilled in the art. In particular, mixing devices with a propeller or blade agitator are suitable for the dispersing and homogeneous mixing of the pigments in the coating system. The modified pigments can be added to a substantially finished mixture, which already contains all the additives, or to an intermediate product into which the pigments and then the additives are mixed in.

The organic compounds according to the invention, which are bound to the metal oxide layer of the effect pigment, are co-crosslinked with the binders of the radiation-curable, preferably UV-curable, coating system during the curing reaction. During the curing of coatings using UV radiation, UV-induced carbon-centred radicals are formed, optionally through the use of photoinitiators, which radicals have their origin in mono-, di- or polyfunctional acrylates and/or methacrylates which are contained in the binder of the system. The radical chain reaction of these constituents of the binder with themselves as well as with the carbon-carbon multiple bonds of the modifying coating of the metallic effect pigments leads to a curing of the coating and an associated co-crosslinking of the metallic effect pigments.

The use of the present invention surprisingly leads to coatings that combine the process-related advantages of UV technology with an unexpectedly high mechanical resistance (abrasion resistance) and an attractive metallic effect.

As UV-curable coating compositions, conventional solvent-based UV hybrid systems or water-based UV hybrid systems as well as 100% solvent-free coating systems, which are known to a person skilled in the art, can be employed. These coating systems generally contain binders (in particular prepolymers), solvents, water, reactive polymerizable monomers (reactive diluents) and photoinitiators, or only monomers, prepolymers (binders) and photoinitiators. Particularly preferred are 100% solvent-free coating systems.

As UV-curable binders, conventional binders known to a person skilled in the art can be employed, wherein both radically polymerizable and cationically polymerizable binders are suitable. Examples of radically polymerizable binders are in particular acrylate- or methacrylate-functional polymers, prepolymers or oligomers, such as polyester (meth)acrylates, polyether (meth)acrylates, amino (meth)acrylates, (meth)acrylic copolymers, polyurethane (meth)acrylates, epoxy resin (meth)acrylates. Preferably, the binders contain 2 to 20 polymerizable olefinic double bonds per molecule. Particularly preferred are 2 to 6. Examples of cationically polymerizable binders are in particular epoxy oligomers, such as for example glycerol triglycidyl ether, polyalkylene glycol diglycidyl ether, and epoxy-urethane resins. The binders are employed in conventional quantities familiar to a person skilled in the art, in particular in quantities of up to 50 wt. % of the coating composition, preferably up to 15 wt. %.

The radiation-curable, or preferably UV-curable, coating systems according to the invention can contain UV-curing monomers, which are also referred to as reactive diluents. These are understood to be molecules possessing one or more reactive carbon-carbon multiple bonds. Conventional monomers known to a person skilled in the art can be employed as reactive diluents. In a preferred embodiment, these are acrylate monomers, methacrylate monomers or vinyl monomers. Examples of polyfunctional acrylates or methacrylates that can be employed in the binder are: tetraethylene glycol diacrylate, triethylene glycol diacrylate, tetraethylene glycol dimethacrylate, triethylene glycol dimethacrylate, polyethylene glycol 400 diacrylate, 2,2'-bis(4-acryloxyethoxyphenyl)propane, ethylene glycol dimethacrylate, diethylene glycol dimethacrylate, 1,6-hexanediol dimethacrylate, 1,6-hexanediol diacrylate, 1,12-dodecanediol dimethacrylate, neopentyl glycol dimethacrylate and trimethylolpropane trimethacrylate. Examples of vinyl monomers are vinyl ethers etc. The reactive diluents can constitute up to 95 wt. %, preferably 30 to 80%, of the coating composition.

The UV-curable coating systems according to the invention contain conventional UV photoinitiators known to a person skilled in the art. Examples of radical curing systems are benzophenone and derivatives thereof, benzoin and derivatives thereof, acetophenone and derivatives thereof, anthraquinone, thioxanthone and derivatives thereof or organophosphorus compounds. Examples of cationic curing systems are onium salts, in particular diazonium salts, sulfonium salts or iodonium salts. The photoinitiators are employed in conventional quantities familiar to a person skilled in the art, in particular in quantities of 0.5 to 15 wt. % of the coating composition and preferably 2 to 10 wt. %.

In addition to these compounds, the coating compositions can comprise conventional polymerization inhibitors, conventional fillers, further pigments and conventional additives, as employed in the coatings industry or the printing inks industry. Also suitable as pigments are carbon black, phyllosilicates, titanium dioxide, coloured pigments, calcium carbonate and kaolin and suitable fillers are for example silicon dioxide or aluminium silicate. As additives, conventional additives from the coatings industry or printing inks industry can be employed, in particular dispersants, redispersing agents, polymerization inhibitors, antifoams, catalysts, adhesion promoters, flow agents, thickeners or matting agents.

The UV lacquer (coating) and UV inks according to the invention can have various pigment contents depending on the application, as known to a person skilled in the art. Particularly preferably, the pigment content is in the range of 2-45 wt. %.

The modified effect pigments can be employed in the UV lacquer or UV printing inks in various quantities, depending on the printing method and pigment type, as can be seen from the following table with preferred weight-% of pigment per total weight of UV lacquer or ink.

| Printing Process | Gold bronze | Aluminum | DECOMET ® |
| --- | --- | --- | --- |
| Flexographic printing | 35-40 | 15-20 | 2.5-4.0 |
| Intaglio printing | 30-35 | 10-12 | 2.5-4.0 |
| Screen printing | 35-40 | 15-20 | 4.0-6.0 |
| Offset | 30-45 | 15-25 | 2.5-5.0 |

The UV curing preferably takes place using UV radiation sources with emissions in the wavelength range of 180 to 420 nm, in particular 200 to 400 nm. Examples of such radiation sources are generally known radiation sources and include pulsed and unpulsed UV lasers, optionally doped medium-pressure mercury lamps, high-pressure mercury lamps and low-pressure mercury lamps, gas discharge tubes, UV spotlights such as e.g. UV LEDs or black light tubes. Further preferred is the use of UV flashlights (xenon). For printing applications, UV lamps with an output of 130-140 W/cm at a printing rate of 80 to 100 m/min are preferably employed.

The drying and curing using the UV radiation sources takes place in a conventional manner known to a person skilled in the art. The irradiation and curing of the coating or printing ink typically lasts only fractions of seconds, wherein UV-curable hybrid systems in particular can be post-curing systems, i.e. it can take a certain length of time for them to develop their final properties.

A further part of the invention is a use in which the coating system is cured by electron beams. These are so-called electron beam (EB) systems. EB dryers are electron accelerators and are known to a person skilled in the art for electron beam curing of lacquers and printing inks. In non-thermal electron beam processes, polymers and lacquers can be cured in a controlled manner. The lacquers are cured with electrons that have been accelerated using low energy. Modern EB dryers work with acceleration voltages of 80 to 125 kV, which are particularly suitable for the curing of lacquers and printing inks. The radiation curing takes place under inert conditions with nitrogen being the inert gas of choice in most cases; carbon dioxide can also be used occasionally to displace the oxygen from the irradiation chamber. This technology is characterized in particular by the following advantages: no post-curing of the lacquers, compact equipment, no need for expensive photoinitiators (UV), higher curing rate, lower energy requirement, less ozone formation.

According to another aspect of the invention, so-called UV/water hybrid systems can be employed. These lacquers or printing inks are comparable with conventional water-based lacquers in terms of their composition, but they are dried by heating and by irradiation with UV. Physical drying first takes place (by removal of water) using heat or hot air. Polymerization is then initiated by UV radiation, the coating is chemically cured and the final lacquer film is produced.

Areas of application for the coating system according to the invention are preferably in the production of lacquers, paints, printing inks, cosmetics, such as e.g. nail varnish, or plastics. After processing, these exhibit excellent application properties and optical properties, in particular with very good abrasion resistance combined with very good metallic gloss effects. The use according to the invention includes in particular offset printing inks, screen printing inks (also in-mould technology), flexographic printing inks, overprinting varnishes, intaglio printing inks, ink-jet inks, digital printing inks (such as ink jet) or cosmetics, such as nail varnishes. The uses according to the invention are also particularly suitable for the coating of plastics, wooden parts, metallic parts, glass parts, as coil & can coating and for the coating of 3D components by means of dual-cure curing with 2-pack PU systems.

The radiation-curable, or preferably UV-curable, coating compositions according to the invention comprise the pigments as described in claim 1 or 2 and in detail above. In addition, these UV-crosslinkable coating systems contain UV-curable monomers, binders such as in particular oligomers, prepolymers and mainly low molecular weight resins containing reactive carbon-carbon multiple bonds, and optionally photoinitiators. Examples of the UV-curable monomers, binders and photoinitiators are described in detail above in the context of the use according to the invention.

In a final aspect, the invention comprises a process for the production of a UV-cured coating according to claim 16 and the curing of the coating system upon exposure to UV light and/or electron beams, wherein a cured coating is formed which contains the metallic effect pigments according to the invention in co-crosslinked form.

The invention is explained in more detail below by the following examples.

EXAMPLES

Example 1

430 g of the aluminum pigment (Decomet®) 1002 from Schlenk Metallic Pigments, 10% in isopropanol) was coated in the first step with 10% (based on the aluminum portion) $SiO_2$. In the subsequent modification step, 150 g isopropanol was added and the mixture was heated to 40° C. accompanied by stirring. After this temperature was reached, 6 g of ammonia and 0.6 g of the methacrylate-functional silane Dow Corning® Z 6030 from Dow Corning were added and the mixture was stirred for a further 2 h.

Next, this pigment dispersion was adjusted to a solids content of 10%.

8 g of pigment dispersion were then mixed with 12 g of the UV printing ink Varnish UV VP/12213 from Schlenk (an acrylate-based UV printing ink) using a blade agitator at a rotational speed of 20 rpm until a homogeneous mixture was formed.

Next, the printing ink that was obtained was applied onto a Chromolux 700 paper substrate by intaglio printing (using an Erichsen Gravure Proofer) at 150 lines/inch.

Prior to UV curing, the prints were stored at 80° C. for 30 min so that the solvent portions could escape completely. The UV curing took place at a band speed of 10 m/min and an emitter lamp intensity of 184 W/cm².

The results of the printing ink according to the invention for hiding power, gloss and abrasion resistance are shown in Table 1.

Example 2

Production and application as in Example 1, wherein 1.2 g of the silane Dow Corning® Z 6030 were employed for modifying the effect pigment.

Example 3

Production and application as in Example 1, wherein 2.4 g of the silane Dow Corning® Z 6030 were employed for modifying the effect pigment.

Comparison Example A

Instead of a pigment dispersion according to the invention with specially modified pigments, a dispersion with leafing pigment (Decomet® UV 2798/10) was used. All the other data on the production of the printing ink and its application correspond to those of Examples 1 to 3.

Comparison Example B

Instead of a pigment dispersion according to the invention with specially modified pigments, a dispersion with unmodified, uncoated pigment (Decomet® 1002, 10% slurry in isopropanol) was used. All the other data on the production of the printing ink and its application correspond to those of Examples 1 to 3.

Comparison Example C

Instead of a pigment dispersion according to the invention with specially modified pigments, a dispersion with unmodified pigment coated only with a silicon dioxide was used. This was produced in analogy to Ex. 1, but omitting the modification step with the methacrylic-functionalized silane. All the other data on the production of the printing ink and its application correspond to those of Examples 1 to 3.

In the following Table 1, the results of the examples according to the invention and the comparison examples are listed.

TABLE 1

| Printing ink | Hiding power[1] | Gloss points[2] | Abrasion test[3] Rubbing surface | Abrasion test[4] Printed paper | Abrasion test Sum |
|---|---|---|---|---|---|
| Ex. 1 | 0.60 | 382 | 5 | 4.5 | 9.5 |
| Ex. 2 | 0.63 | 384 | 5 | 4.5 | 9.5 |
| Ex. 3 | 0.58 | 350 | 4 | 3.5 | 7.5 |
| Comp. A | 1.56 | 475 | 1.5 | 1 | 2.5 |
| Comp. B | 0.59 | 362 | 3 | 2 | 5 |
| Comp. C | 0.44 | 299 | 3.5 | 3 | 6.5 |

[1]Measurement of intaglio printing using a densitometer (Techkon RT120) after previous calibration of the substrate
[2]Measurement of intaglio printing using a reflectometer (Byk micro-gloss instrument) at 60°, measurement based on DIN 67530, adapted to higher values. Very good: values of 370 and more, good: values of more than 300 to less than 370, poor: values of less than 300
[3,4]Abrasion test based on ISO 105-A03 DIN EN 20105-A03:1994 Evaluation of colour fastness using the grey scale. The abrasion test is evaluated visually with reference to staining of the rubbing surface (3) and damage to the printed paper (4). Definitive evaluation of abrasion resistance is the sum (5) of the evaluations of abrasion: rubbing surface (3) and abrasion: printed paper (4). Score 5: very good, score 4: good, score 3: poor, score 2: very poor, score 1: extremely poor. The determination of abrasion resistance takes place after abrasion loading by a "Prüfbau" instrument after conditioning the prints at ambient temperature for at least 24 h. Paper circles (standard white paper 80 g/m²) with a 4.5 cm diameter were punched out and moved over the intaglio printing with a rotary motion (4 revolutions per 60 double strokes) with a total load of approx. 613 g in the form of 120 double strokes.

The results show that the use of the modified pigments according to the invention in UV printing inks is clearly superior in terms of abrasion resistance to the use of leafing pigments or pigments that are coated only with a silicon dioxide layer or uncoated. The hiding power and gloss of examples 1 to 3 correspond to the versions of comparable unmodified, uncoated pigments. Compared with unmodified silicon dioxide-coated pigments, the pigments according to the invention exhibit better hiding power, better gloss and better abrasion resistance.

The invention claimed is:

1. A process for the production of a radiation-curing coating composition, comprising mixing a modified effect pigment the modified effect pigment with a coating composition comprised of prepolymer binders, monomers and curing of the coating composition upon exposure to UV light and/or electron beams, thereby forming the cured coating composition, wherein the modified effect pigment has no organic oligomers or polymers and is an effect pigment that is coated with at least one layer of a metal oxide and comprises silicon dioxide, aluminium oxide, titanium dioxide, iron oxide, tin oxide, zinc oxide or mixtures thereof, and at least one organic compound having one or more functional groups with a carbon-carbon multiple bond, wherein the organic compound is bound to the layer of a metal oxide.

2. The process according to claim 1, wherein the modified effect pigment is present as a dispersion.

3. The process according to claim 1, wherein the radiation-curable coating composition is a UV-curable coating composition.

4. The process according to claim 1, wherein the organic compound of the modified effect pigment in the cured coating is co-crosslinked with a binder of the coating.

5. The process according to claim 1, wherein the carbon-carbon multiple bond is C=C.

6. The process according to claim 1, wherein the functional group is an acrylate group, a methacrylate group, a strained ring system or a vinyl group.

7. The process according to claim 1, wherein the at least one organic compound is a monomeric compound.

8. The process according to claim 1, wherein the at least one organic compound is an acrylic silane, a methacrylic silane, a maleic anhydride, a vinyl phosphonic acid or a vinyl phosphonate.

9. The process according to claim 1, wherein the at least one organic compound is bound covalently to the metal oxide layer on the effect pigment via a silane group, a phosphonate group, a titanate, a borate or one of the acid groups.

10. The process according to claim 1, wherein the organic compounds are bound to the effect pigment via a silane group, a phosphonate group, a titanate, a borate or one of the acid groups.

11. The process according to claim 1, wherein the effect pigment is a metallic effect pigment selected from the group consisting of aluminum, titanium, zirconium, copper, zinc, gold, silver, silicon, tin, steel, iron and alloys thereof or mixtures thereof, or the effect pigment is a pearlescent pigment, mica or mixtures thereof.

12. The process according to claim 1, wherein the radiation-curable coating composition is a solvent-based system, a solvent-free system, a UV/water hybrid system or an electron beam system.

13. The process according to claim 1, wherein the radiation-curable composition additionally comprises radically or cationically polymerizable monomers or binders and optionally photoinitiators.

14. The process according to claim 13, wherein the monomers are acrylate monomers, methacrylate monomers or vinyl monomers.

15. The process according to claim 1, wherein said coating composition is a lacquer, paint, printing ink, nail varnish, ink, surface coating or plastic.

16. The process according to claim 1 wherein the monomer is a reactive diluent.

17. The process according to claim 1 wherein the coating composition additionally comprises a volatile solvent and wherein the solvent is removed by physical drying prior to curing.

* * * * *